A. J. SMITH.
PHONOGRAPHIC NEEDLE.
APPLICATION FILED MAR. 13, 1909.

940,486.

Patented Nov. 16, 1909.

Witnesses
Wm. P. Bond
Pirrson W. Banning.

Inventor:
Andrew J. Smith.
by Banning & Banning
Attys

UNITED STATES PATENT OFFICE.

ANDREW J. SMITH, OF CHICAGO, ILLINOIS, ASSIGNOR OF ONE-HALF TO FREDERICK R. BAKER, OF CHICAGO, ILLINOIS.

PHONOGRAPHIC NEEDLE.

940,486.  Specification of Letters Patent. Patented Nov. 16, 1909.

Application filed March 13, 1909. Serial No. 483,178.

*To all whom it may concern:*

Be it known that I, ANDREW J. SMITH, a citizen of the United States, residing at Chicago, in the county of Cook and State of Illinois, have invented certain new and useful Improvements in Phonograph-Needles, of which the following is a specification.

In the making of phonograph needles, it is highly desirable that the substance from which the needle is formed should be of sufficient strength and toughness to maintain a fine point adapted to register the most minute variations in the record line, and at the same time have a certain smoothness and pliability which will prevent the needle from scratching the record.

The needle of the present invention possesses qualities which render it highly satisfactory for phonographic purposes. It is of such tough fiber and consistency as to maintain a point for a relatively long period and at the same time will not scratch or wear away the finer variations in a record line, nor will the point burn off when subjected to the heat of friction. Moreover, the present needle secures a tone which is ample in volume and of the finest quality, being free from all scratching or metallic noises and reproducing the finest variations of tone and quality in the record.

Figure 1:
Figure 2:
Figure 3:
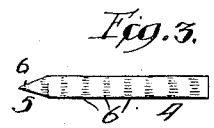
Figure 4:
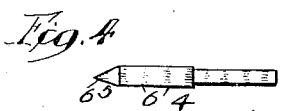

In the drawings illustrating the invention, Figures 1 and 2 are views showing cactus spines from which the needles are made; and Figs. 3 and 4, views showing the completed needles.

The needle is made from the spines of a cactus found more particularly in arid portions of New Mexico and Arizona, the spines of which are distinguished by the presence of bands or rings which extend through the body of the spine, which latter when scraped is ordinarily in part of a reddish or rose color and in part of a whitish translucent color. The spine, in its natural state, as shown in Figs. 1 and 2, varies in shape, in some cases being bent or hooked like a claw, as shown in Fig. 2, and in other cases being straight, as shown in Fig. 1.

The spines of the genus *Echinocactus* possess the characteristics above referred to and are particularly adapted for the purpose of making phonographic needles, although some other varieties of the cactus plant possess similar qualities in a greater or less degree. The extremely dry conditions under which such cacti grow, together with the slowness of development, seem to account, in part, for the toughness and hardness of the spines which possess these characteristics in a marked degree as compared with the thorns of most plants or trees which grow under ordinary conditions of climate and rainfall.

In making phonographic needles from the spines, the upper surface or layer of the spine, which is of a roughened or corrugated nature, is cut or scraped away, and the spine is cut down to the requisite size to provide a straight or shouldered shank portion 4 and a blunt point 5, the tip of which terminates in one of the rings 6 which appear to be of a somewhat harder consistency than the intermediate portions of the spine.

In using phonographic needles made from the spines of the cactus, the needles, instead of wearing away or deteriorating, appear to improve with moderate usage and may be used repeatedly without injury either to the needle or the record. The cactus spines are of a carboniferous nature and of exceedingly fine and even grain, so that they can be sharpened to the finest point and resharpened from time to time as occasion may require.

What I regard as new and desire to secure by Letters Patent is:

A phonograph needle made from the spine of a cactus plant, said spine having rings or bands of greater hardness than the intermediate sections of the spine, and having its point formed to terminate in one of said rings or bands.

ANDREW J. SMITH.

Witnesses:
WALKER BANNING,
PIERSON W. BANNING.